(12) United States Patent
Gaitan et al.

(10) Patent No.: US 11,037,750 B2
(45) Date of Patent: Jun. 15, 2021

(54) HIGH CURRENT FUSE BLOCK

(71) Applicant: YAZAKI NORTH AMERICA, INC., Canton, MI (US)

(72) Inventors: Max Noel Gaitan, Durango (MX); Jen Vun Ng, Westland, MI (US); Jeffrey Lixin Liu, Windsor (CA)

(73) Assignee: YAZAKI NORTH AMERICA, INC., Canton, MI (US)

( * ) Notice: Subject to any disclaimer, the term of this patent is extended or adjusted under 35 U.S.C. 154(b) by 0 days.

(21) Appl. No.: 16/130,374

(22) Filed: Sep. 13, 2018

(65) Prior Publication Data

US 2020/0090894 A1 Mar. 19, 2020

(51) Int. Cl.
| | |
|---|---|
| *H01H 85/175* | (2006.01) |
| *B60R 16/023* | (2006.01) |
| *H01H 85/044* | (2006.01) |
| *H01H 85/30* | (2006.01) |
| *H01H 9/22* | (2006.01) |
| *H01R 9/24* | (2006.01) |
| *H02G 3/08* | (2006.01) |
| *H01H 85/25* | (2006.01) |
| *H01H 85/055* | (2006.01) |
| *H01H 85/20* | (2006.01) |

(52) U.S. Cl.
CPC ..... *H01H 85/1755* (2013.01); *B60R 16/0238* (2013.01); *H01H 9/22* (2013.01); *H01H 85/044* (2013.01); *H01H 85/30* (2013.01); *H01R 9/2458* (2013.01); *H02G 3/086* (2013.01); *H01H 85/25* (2013.01); *H01H 2085/0555* (2013.01); *H01H 2085/208* (2013.01)

(58) Field of Classification Search
CPC .. H01H 85/1755; H01H 85/30; H01H 85/044; H01H 9/22; H01H 2085/208; H01H 85/25; H01H 2085/0555; B60R 16/0238; H01R 9/2458; H02G 3/086
USPC .................................................. 337/191, 205
See application file for complete search history.

(56) References Cited

U.S. PATENT DOCUMENTS

| | | | |
|---|---|---|---|
| 5,179,503 A * | 1/1993 | Fouts ..................... | H05K 7/026 307/10.1 |
| 5,854,583 A | 12/1998 | Falchetti | |
| 5,873,753 A * | 2/1999 | Norris, Jr. .......... | H01R 13/4367 439/752 |
| 6,512,443 B1 | 1/2003 | Matsumura et al. | |

(Continued)

FOREIGN PATENT DOCUMENTS

| | | |
|---|---|---|
| JP | 2011142772 A | 7/2011 |
| JP | 2013526768 A | 6/2013 |

(Continued)

*Primary Examiner* — Stephen S Sul
(74) *Attorney, Agent, or Firm* — RMCK Law Group, PLC (57) ABSTRACT

A power distribution box assembly can include a power distribution box housing, a fuse block, and a plurality of eyelet terminals. The fuse block can include a stamped busbar assembly, a plurality of studs, and a housing. The stamped busbar assembly can include a main power supply portion, a plurality of fuse elements, and a plurality of terminal connecting portions coupled to the plurality of fuse elements. Each of the plurality of terminal connecting portions can: (i) extend from its respective fuse element in a terminal direction that is orthogonal to both directions that the main power supply portion and the fuse elements extend.

18 Claims, 7 Drawing Sheets

(56) References Cited

U.S. PATENT DOCUMENTS

| | | | |
|---|---|---|---|
| 8,130,070 B2* | 3/2012 | Shibata | H01H 85/044 29/623 |
| 8,669,840 B2 | 3/2014 | Urrea et al. | |
| 10,269,524 B2* | 4/2019 | Kawase | H01H 69/02 |
| 2008/0030295 A1* | 2/2008 | Matsumoto | H01H 85/044 337/290 |
| 2009/0068894 A1* | 3/2009 | Ohashi | H01R 11/28 439/620.26 |
| 2009/0108982 A1* | 4/2009 | Ohashi | H01H 85/044 337/191 |
| 2010/0040431 A1* | 2/2010 | Suzuki | F16B 5/0275 411/166 |
| 2011/0285496 A1* | 11/2011 | Urrea | H01H 85/12 337/188 |
| 2012/0020036 A1* | 1/2012 | Matsumoto | H01H 85/044 361/752 |
| 2012/0064771 A1* | 3/2012 | Urrea | H01R 13/68 439/620.29 |
| 2012/0293295 A1* | 11/2012 | Kibushi | H01H 85/044 337/142 |
| 2014/0183310 A1 | 7/2014 | Shimizu | |
| 2014/0196925 A1* | 7/2014 | Kowtun | H02G 3/16 174/50 |
| 2015/0130584 A1* | 5/2015 | Totsuka | H01H 85/12 337/186 |
| 2015/0179379 A1* | 6/2015 | Nohara | H01H 85/12 337/68 |
| 2016/0141141 A1* | 5/2016 | Ohashi | H01H 85/20 337/227 |
| 2016/0203934 A1* | 7/2016 | Ishikawa | B60R 16/04 337/187 |
| 2017/0358418 A1* | 12/2017 | Carnick | H01H 85/0241 |
| 2018/0205188 A1* | 7/2018 | Urrea | H01H 85/0241 |
| 2018/0301310 A1* | 10/2018 | Allcorn | H01H 85/20 |
| 2019/0181627 A1* | 6/2019 | Matsuura | H01R 13/447 |
| 2019/0229439 A1* | 7/2019 | Matsuura | B60R 16/0238 |

FOREIGN PATENT DOCUMENTS

| | | |
|---|---|---|
| JP | 2014063582 A | 4/2014 |
| JP | 2015076378 A | 4/2015 |
| WO | 2011146630 A2 | 11/2011 |

* cited by examiner

HIGH CURRENT FUSE BLOCK

FIELD

The present disclosure relates to a fuse block assembly, and more particularly to a compact fuse block device for use with automotive vehicles.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Electrical distribution systems of vehicles typically include one or more fuse assemblies for providing a circuit protection functionality. Such conventional fuse assemblies can be bulky and difficult to install and service. For example only, some fuse assemblies may require a person to install electrical connections (e.g., electrical terminals) from multiple angles or directions. Such fuse assemblies may also have a large width and/or length in order to include the appropriate number of terminal connections. It would be desirable to provide an improved fuse box assembly that overcomes these and other limitations in the art.

SUMMARY

In various embodiments of the present disclosure, an automotive power distribution box assembly is disclosed. The power distribution box assembly can include a power distribution box housing, a fuse block, and a plurality of eyelet terminals. The power distribution box housing can include a power distribution box stud. The fuse block can be coupled to the power distribution box. The fuse block can include a stamped busbar assembly, a plurality of studs, and a housing. The stamped busbar assembly can include a main power supply portion extending in a longitudinal direction from a first end to a second end. The main power supply portion can have a rectangular shaped body with a first side edge and a second side edge opposite the first side edge. The first and second side edges can extend from the first end to the second end.

The stamped busbar assembly can include a plurality of fuse elements extending from the first side edge of the main power supply portion in a fuse direction orthogonal to the longitudinal direction. The stamped busbar assembly can additionally include a plurality of terminal connecting portions coupled to the plurality of fuse elements. Each of the plurality of terminal connecting portions can: (i) extend from its respective fuse element in a terminal direction that is orthogonal to both the longitudinal direction and the fuse direction, and (ii) define a stud aperture.

The plurality of studs can correspond to the plurality of terminal connecting portions, respectively. Each of the plurality of studs can be arranged within a corresponding stud aperture. The housing can at least partially cover the stamped busbar assembly and can comprise an insulative material. The housing can be formed by over-molding the stamped busbar assembly and the plurality of studs. The plurality of eyelet terminals can be configured for coupling to a respective stud and terminal connecting portion. The main power supply portion can define a power input aperture in which the power distribution box stud is received. The power input aperture can be arranged in a middle portion of the main power supply portion such that at least one fuse element is arranged on either side of the power input aperture. The housing can include an access aperture corresponding to each of the plurality of studs in which at least one of the plurality of eyelet terminals is arranged.

In various additional or alternative embodiments of the present disclosure, a fuse block is disclosed. The fuse block can include a stamped busbar assembly, a plurality of studs, and a housing that at least partially covers the stamped busbar assembly. The stamped busbar assembly can comprise a main power supply portion, a plurality of fuse elements, and a plurality of terminal connecting portions. The main power supply portion can extend in a longitudinal direction from a first end to a second end. Further, the main power supply portion can have a rectangular shaped body with a first side edge and a second side edge opposite the first side edge. The first and second side edges can extend from the first end to the second end.

The plurality of fuse elements can extend extending from the first side edge of the main power supply portion in a fuse direction orthogonal to the longitudinal direction. The plurality of terminal connecting portions can be coupled to the plurality of fuse elements. Each of the plurality of terminal connecting portions can: (i) extend from its respective fuse element in a terminal direction that is orthogonal to both the longitudinal direction and the fuse direction, and (ii) define a stud aperture. The plurality of studs can correspond to the plurality of terminal connecting portions, respectively, wherein each of the plurality of studs can be arranged within a corresponding stud aperture.

The housing can comprise an insulative material and be formed by over-molding the stamped busbar assembly and the plurality of studs. The housing can further include an access aperture corresponding to each of the plurality of studs and configured to receive an eyelet terminal for coupling to a respective stud and terminal connecting portion.

The main power supply portion can define a power input aperture configured to receive a power distribution box stud. The power input aperture can be arranged in a middle portion of the main power supply portion such that at least one fuse element is arranged on either side of the power input aperture.

According to some embodiments of the present disclosure, another fuse block is disclosed. The fuse block can include a stamped busbar assembly, a plurality of studs, and a housing that at least partially covers the stamped busbar assembly. The stamped busbar assembly can comprise a main power supply portion, a plurality of fuse elements, and a plurality of terminal connecting portions. The main power supply portion can extend in a longitudinal direction from a first end to a second end. Further, the main power supply portion can have a rectangular shaped body with a first side edge and a second side edge opposite the first side edge. The first and second side edges can extend from the first end to the second end.

The plurality of fuse elements can extend extending from the first side edge of the main power supply portion in a fuse direction orthogonal to the longitudinal direction. The plurality of terminal connecting portions can be coupled to the plurality of fuse elements. Each of the plurality of terminal connecting portions can: (i) extend from its respective fuse element in a terminal direction that is orthogonal to both the longitudinal direction and the fuse direction, and (ii) define a stud aperture. The plurality of studs can correspond to the plurality of terminal connecting portions, respectively, wherein each of the plurality of studs can be arranged within a corresponding stud aperture.

The housing can comprise an insulative material and be formed by over-molding the stamped busbar assembly and the plurality of studs. The housing can further include an access aperture corresponding to each of the plurality of studs and configured to receive an eyelet terminal for coupling to a respective stud and terminal connecting portion. The housing can comprise a first portion over-molding at least one first stud and a second portion over-molding at least one second stud. The first portion and second portion can be arranged to form an L-shape in a final configuration.

The main power supply portion can define a power input aperture configured to receive a power distribution box stud.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As previously discussed, fuse assemblies utilized in the electrical distribution systems of vehicles typically suffer from many limitations, e.g., being bulky/large and difficult to install and service. Accordingly, a fuse block and associated power distribution box assembly are presented. The disclosed fuse block and power distribution box are of a compact design and are easily manufactured. Further, the disclosed fuse block and power distribution box are configured to provide many additional benefits including, but not limited to, providing easy access for servicing/replacing a fuse element, providing position assurance in an assembled condition, and providing simple and easy terminal connections in a single direction.

Figure 1:
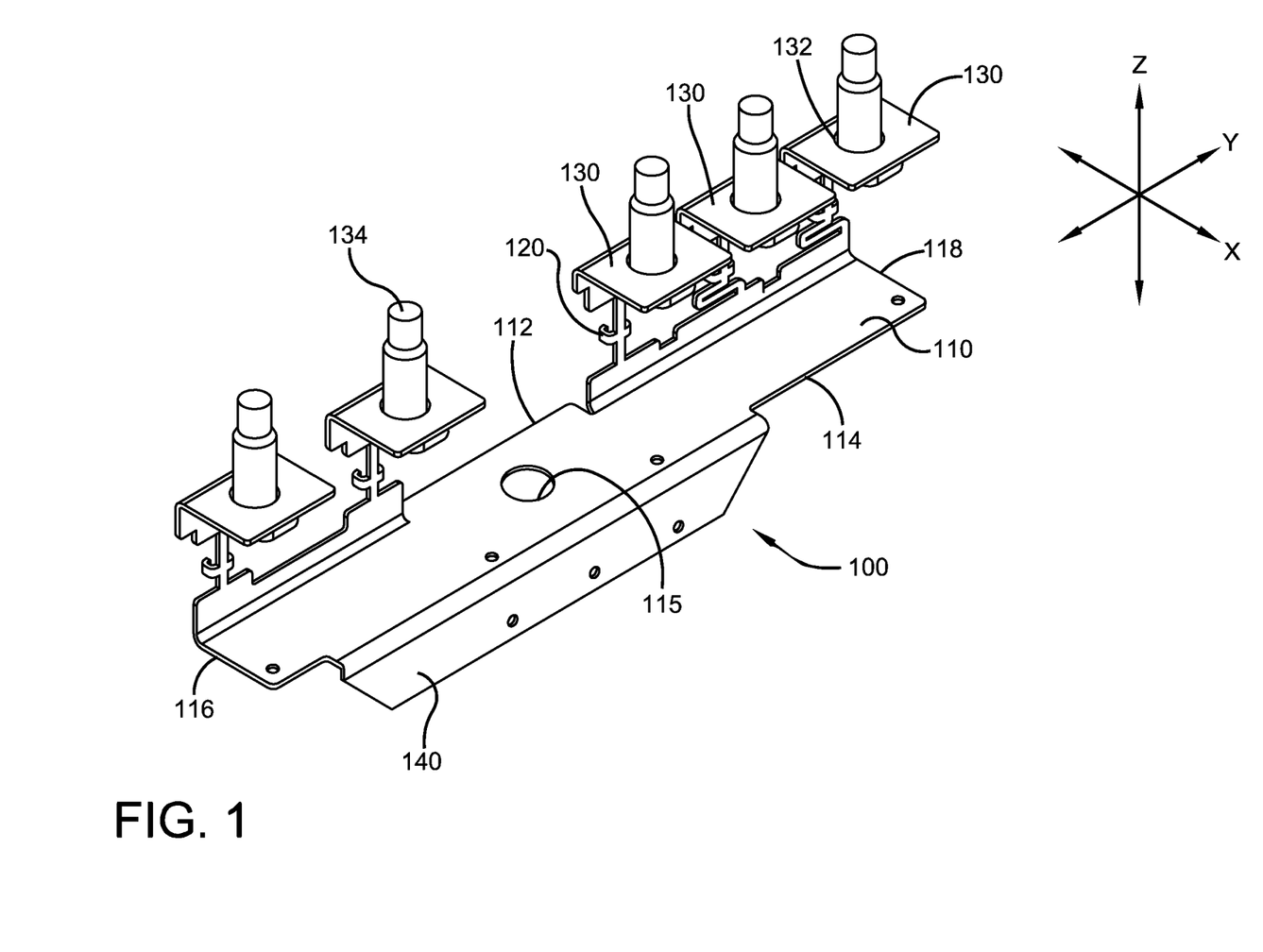
FIG. 1 is a perspective view of a stamped busbar assembly of an example fuse block according to some implementations of the present disclosure.
Figure 2:
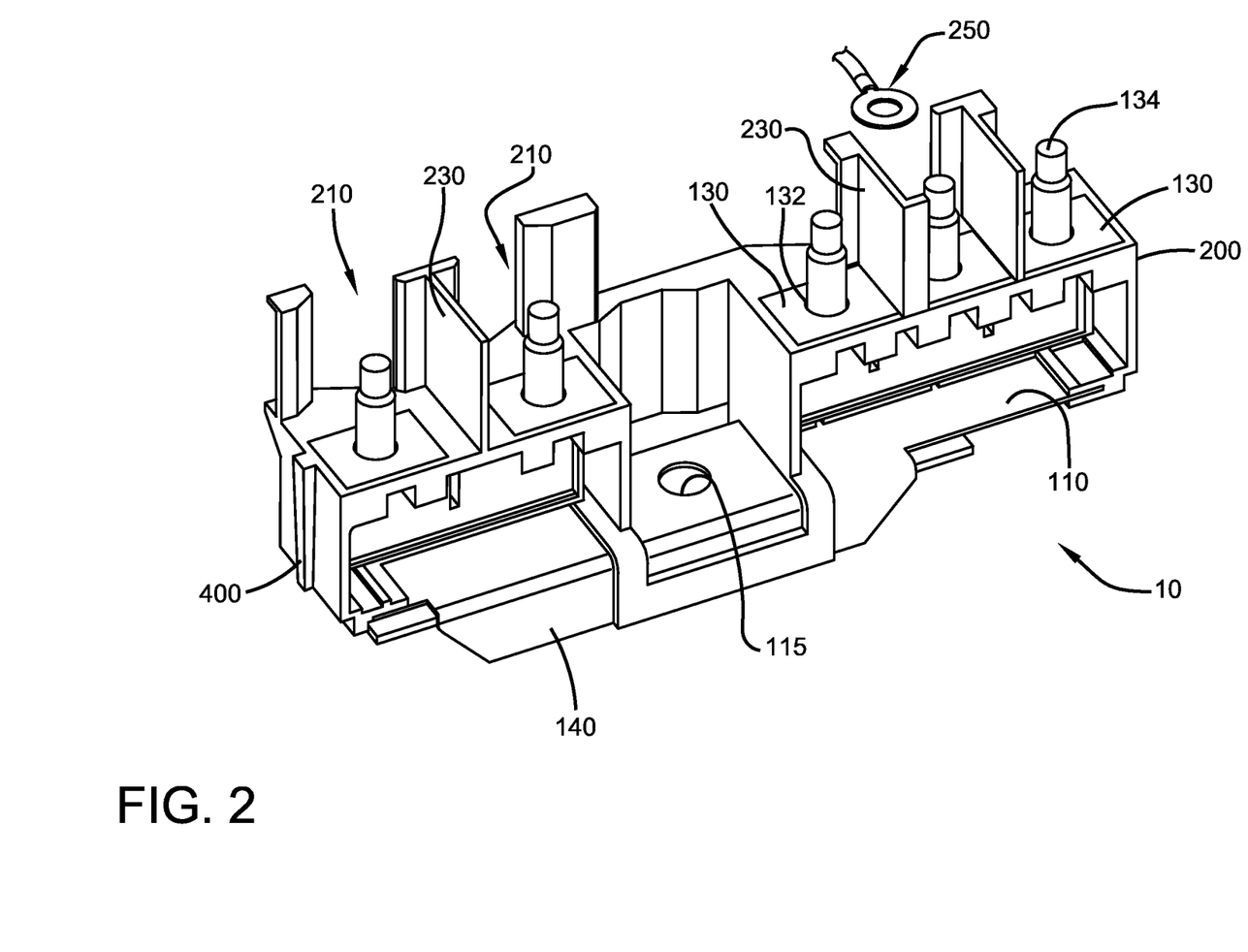
FIG. 2 is a perspective view of an example fuse block that includes the stamped busbar assembly of FIG. 1 according to some implementations of the present disclosure.

Referring now to FIGS. 1 and 2, an example fuse block 10 according to some implementations of the present disclosure is illustrated. The fuse block 10 can include a stamped busbar assembly 100 at least partially covered by a housing 200, as discussed more fully below. The stamped busbar assembly 100 can include a main power supply portion 110 having a rectangular shaped body with a first side edge 112 and a second side edge 114 opposite the first side edge 112. The main power supply portion 110 can extend in a longitudinal direction (along the y-axis as illustrated in FIG. 1) from a first end 116 to a second end 118. Accordingly, the first and second side edges 112, 114 of the stamped busbar assembly 100 can extend from the first end 116 to the second end 118 to define the rectangular shaped body. The stamped busbar assembly 100 can also include a plurality of fuse elements 120. Each of the fuse elements 120 can extend from one of the first or second side edges 112, 114 of the stamped busbar assembly 100 in a direction (a "fuse direction" along the z-axis as illustrated in FIG. 1) that is orthogonal to the longitudinal direction in which the main power supply portion 110 extends. The fuse elements 120 are arranged to connect the main power supply portion 110 to a plurality of terminal connecting portions 130, as more fully discussed below. Each of the fuse elements 120 is designed to provide a circuit protection functionality for its corresponding circuit.

The stamped busbar assembly 100 can further include a plurality of terminal connecting portions 130 coupled to and extending from the fuse elements 120. Each of the terminal connecting portions 130 can extend from a respective fuse element 120 in a direction (a "terminal direction" along the x-axis) that is orthogonal to both the longitudinal and fuse directions. As best illustrated in FIG. 1, the terminal connecting portions 130 can thus be arranged above the main power supply portion 110 such that the stamped busbar assembly 100 is compact and has a relatively small cross section in the x-y plane. Each of the terminal connecting portions 130 can define a stud aperture 132 that is configured to receive a corresponding stud 134. Accordingly, a plurality of studs 134 can correspond to the plurality of terminal connecting portions 130, each of which being arranged within a corresponding stud aperture 132.

Figure 3:
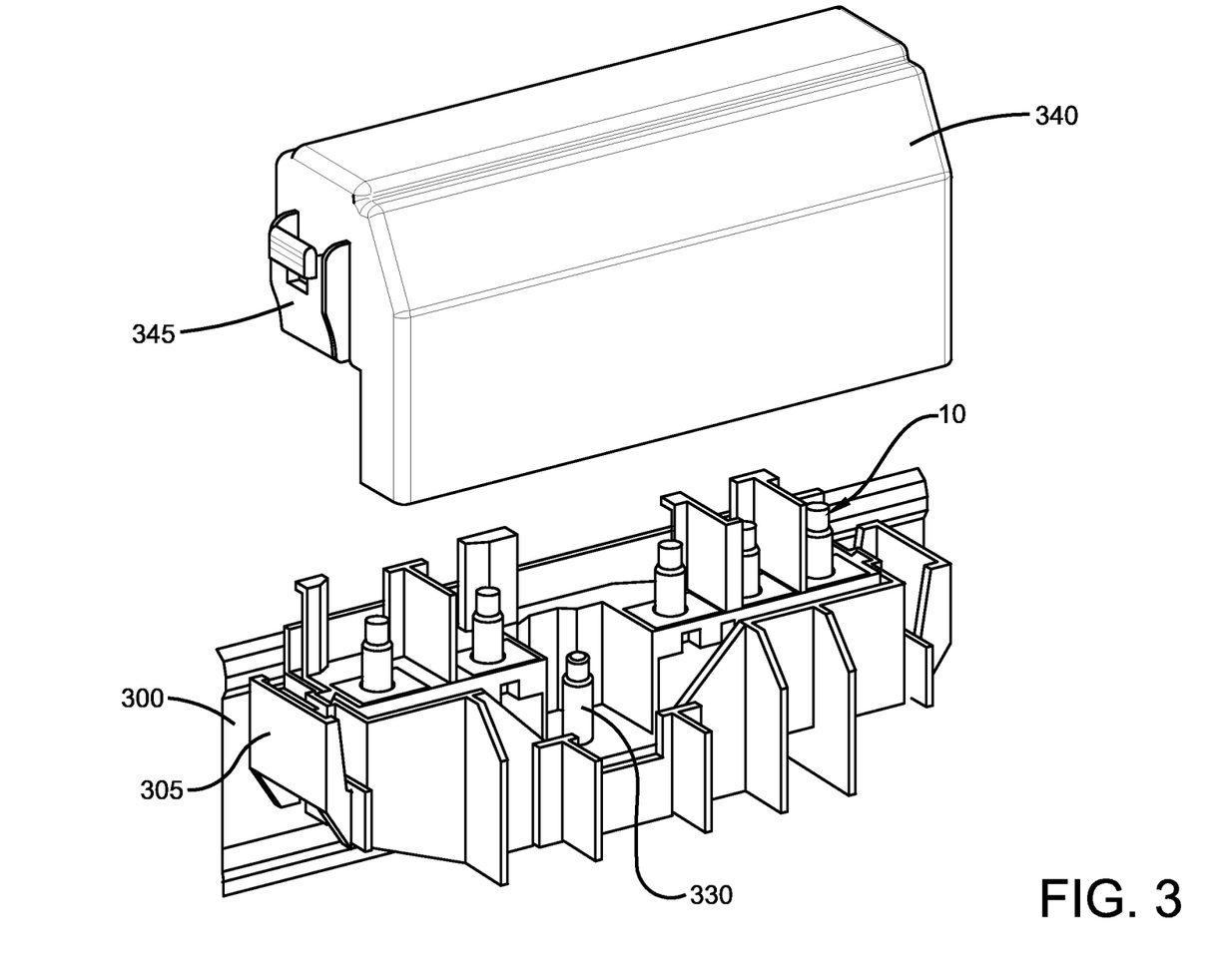
FIG. 3 is a partial perspective view of an example power distribution box assembly with the attached fuse block of FIG. 2 according to some implementations of the present disclosure.

The stamped busbar assembly 100 is made of an electrically conductive material such that electrical power (e.g., from a battery) connected to the main power supply portion 110 can be provided to each of the terminal connecting portions 130 through a fuse element 120. In order to provide a compact design of the fuse block 10, the main power supply portion 110 of the stamped busbar assembly 100 can define a power input aperture 115. The power input aperture 115 can be arranged in a middle portion of the rectangular shaped body of the main power supply portion 110 such that at least one fuse element 120 is arranged on either side of the power input aperture 115. As more fully discussed below, the power input aperture 115 can be configured to receive a power distribution box stud 330 (FIG. 3).

In some implementations, the stamped busbar assembly 100 can include a position assurance flange 140. The position assurance flange 140 can extend from one of the first or second side edges 112, 114. In the illustrated example, the position assurance flange 140 extends from the other edge of the first and second side edges 112, 114 from which the fuse elements 120 extend. Further, the position assurance flange 140 extends in a direction opposite the fuse direction along the z-axis. In this manner, the stamped busbar assembly 100 can be formed by a stamping process, as more fully described below. The position assurance flange 140 can inhibit rotation of the stamped busbar assembly 100 around a power distribution stud 330 (see FIG. 3).

The stamped busbar assembly 100 can be at least partially covered by the housing 200. The housing 200 can comprise an insulative material such that the stamped busbar assembly 100 can be insulated from inadvertent or unintentional electrical connections. In certain aspects, the housing 200 can be formed by over-molding the stamped busbar assembly 100 and the plurality of studs 134. In this manner, the housing 200 can provide physical support to elements of the fuse block 10. For example only, the over-molded housing 200 can rigidly couple and constrain the studs 134 in their respective stud apertures 132.

The housing 200 can further include an access aperture 210 corresponding to each of the plurality of studs 134. The access apertures 210 can be configured to receive an eyelet terminal 250 for coupling to a respective stud 134 and terminal connecting portion 130. In this manner, the eyelet terminals 250 to be connected to the terminal connecting portions 130 in a single direction, that is, through the access apertures 210.

Figure 5:
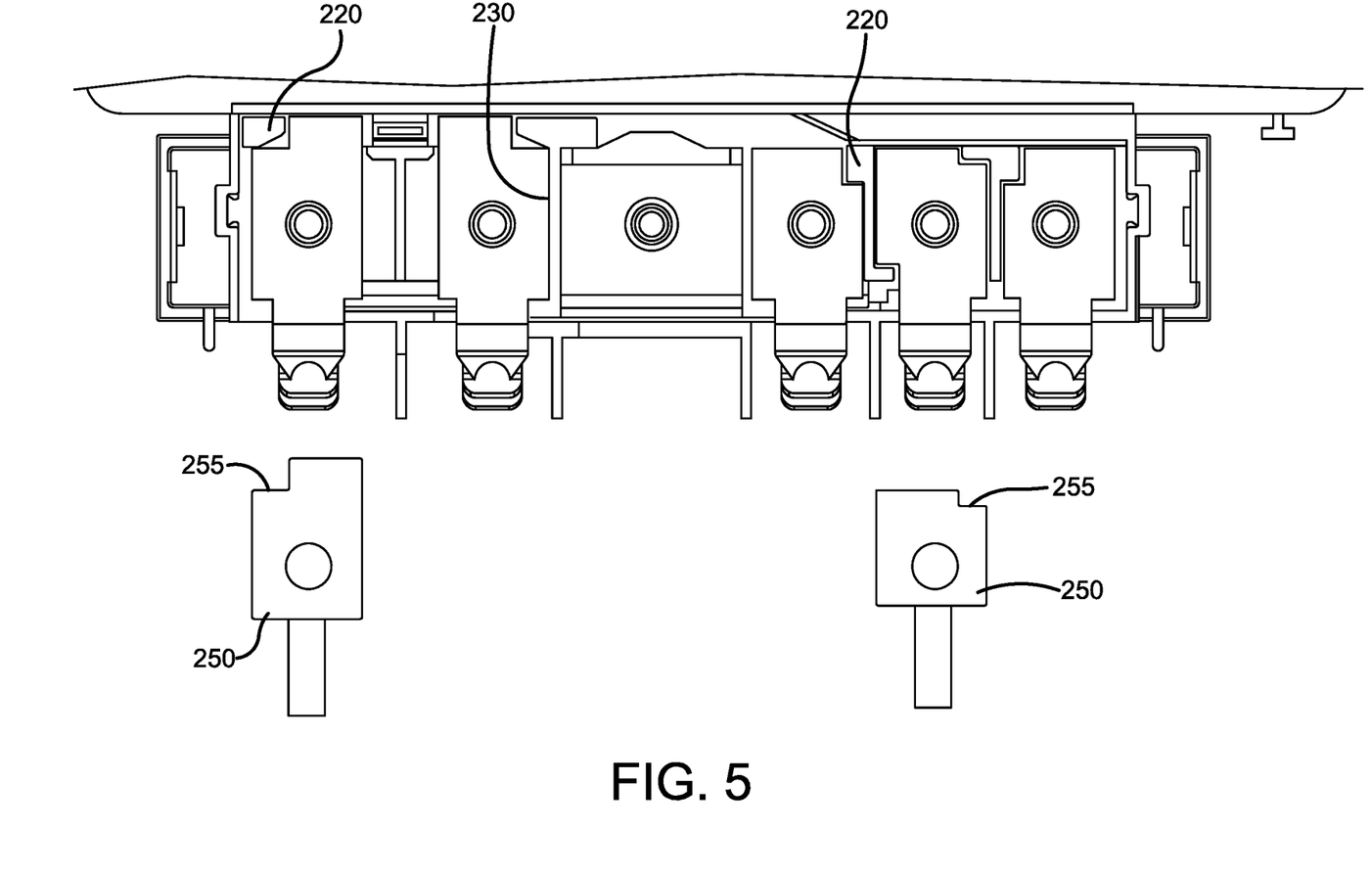
FIG. 5 is a top view of the fuse block of FIG. 2.

In some implementations, and with further reference to FIG. 5, the housing 200 can comprise an index feature 220 associated with one or more of the access apertures 210 and associated terminal connecting portions 130. The index feature can inhibit coupling of an eyelet terminal 250 with the particular terminal connecting portion 130 when the eyelet terminal 250 lacks a corresponding index mating feature 255. Additionally or alternatively, the housing 200 can further include one or more insulating walls 230 for electrically isolating the terminal connecting portions 130. Accordingly, each insulating wall 230 can be arranged between adjacent terminal connecting portions 130.

Figure 4:
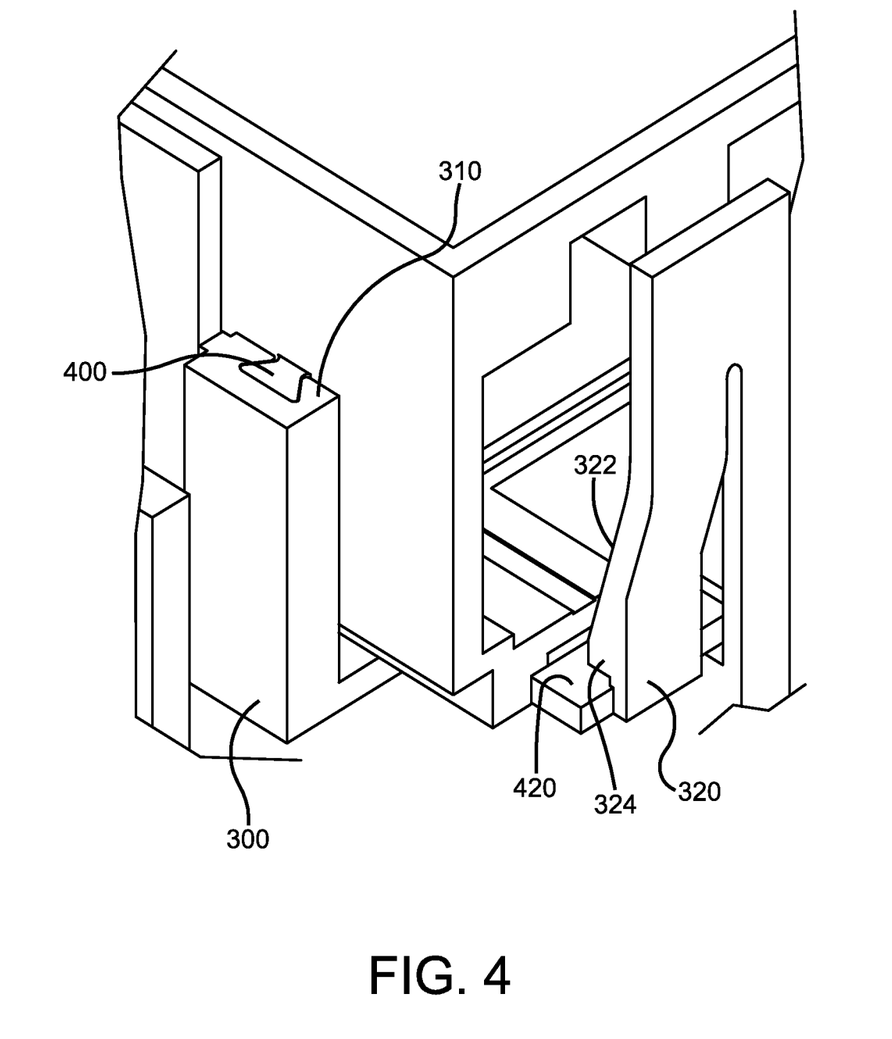
FIG. 4 is an enlarged partial view of the example power distribution box assembly with attached fuse block of FIG. 3.

With further reference to FIGS. 3 and 4, the housing 200 can further comprise a dovetail feature 400 on an exterior surface of the housing 200. The dovetail feature 400 can be configured to mate with a corresponding dovetail feature 310 on a power distribution box 300 to which the housing 200 is coupled. The dovetail features 400, 310 can be configured to inhibit movement of the housing 200 along two axes, e.g., the x- and y-axes as shown in FIG. 1.

The power distribution box 300 can be an automotive power distribution box for distributing power to the various electrical components of a vehicle. By being coupled to the power distribution box 300 (as opposed to being integrated therein) the fuse block 10 can be more easily serviced, replaced, etc. When coupled with the power distribution box 300, the fuse block 10 can be protected from dust and other elements or interference by a cover 340. The cover 340 can mate with the power distribution box 300 via a first locking mechanism 305 formed on the power distribution box 300 and a second locking mechanism 345 formed on the cover 340. The first and second locking mechanisms can cooperate to securely but releasably couple the power distribution box 300 with the cover 340.

Additionally or alternatively, the housing 200 can include a retention member 420 configured to mate with a corresponding locking member 320 on the power distribution box 300 to which the housing 200 is coupled. In the illustrated example of FIG. 4, the locking member 320 comprises a ramp 322 and lock surface 324. The retention member 420 and locking member 320 can inhibit removal of the housing 200 from the power distribution box 300 in a mated condition, e.g., by inhibiting movement of the housing 200 along a removal axis (the z-axis of FIG. 1) that is orthogonal to both of the axes associated with the dovetail features 400, 310 (e.g., the x- and y-axes).

As briefly mentioned above, the fuse block 10 can be coupled to the power distribution box 300 such that a power distribution stud 330 can extend through the power input aperture 115. The power distribution stud 330 can receive an eyelet terminal 250 to input power, e.g., from the vehicle battery (not shown). The stamped busbar assembly 100 can then distribute the vehicle power via the fuse elements 120 and the terminal connecting portions 130. More specifically, each terminal connecting portion 130 can be electrically coupled with an eyelet terminal 250 being secured to a stud 134. The eyelet terminals 250 can provide electrical power to the electrical components of the vehicle.

In some implementations, the stamped busbar assembly 100 can be formed from a single piece of busbar material arranged in a single plane (e.g., the x-y plane of FIG. 1). The single piece of busbar material can be stamped to form the stud apertures 132, the power input aperture 115, and the plurality of fuse elements 120, as well as the terminal connecting portions 130 and associated stud apertures 132. Once stamped, the single piece of busbar material can be bent to arrange the main power supply portion 110 to extend in the longitudinal direction (e.g., along the y-axis of FIG. 1), the plurality of fuse elements 120 to extend in the fuse direction (e.g., along the z-axis of FIG. 1), and the plurality of terminal connecting portions 130 to extend in the terminal direction (e.g., along the x-axis of FIG. 1). In this manner, a single piece of busbar material can be formed and configured to take the shape of the disclosed stamped busbar assembly 100. The fuse block 10 can then be completed by over-molding the housing 200 onto the stamped busbar assembly 100. Additionally, in some implementations the over-molded housing 200 can rigidly couple and constrain the studs 134 that have been inserted in their respective stud apertures 132.

Figure 6:
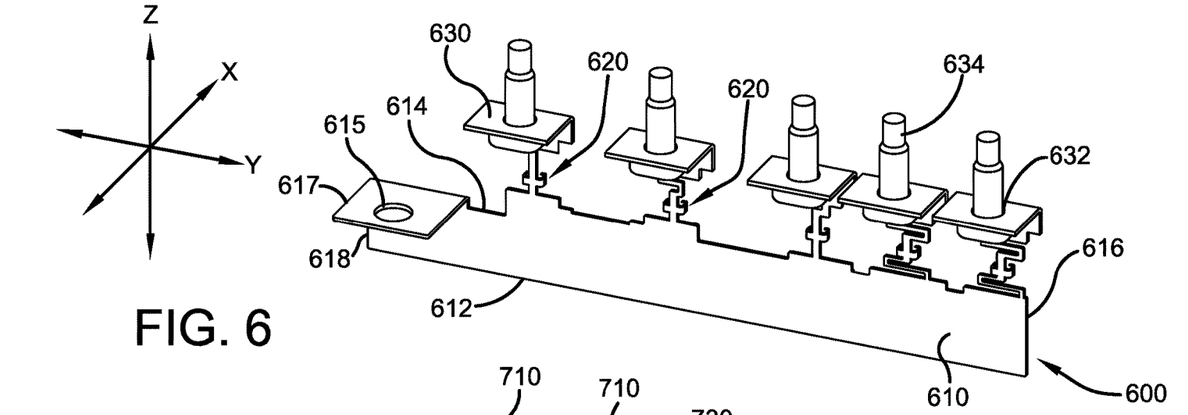
FIG. 6 is a perspective view of a stamped busbar assembly of an example fuse block according to some implementations of the present disclosure.
Figure 7:
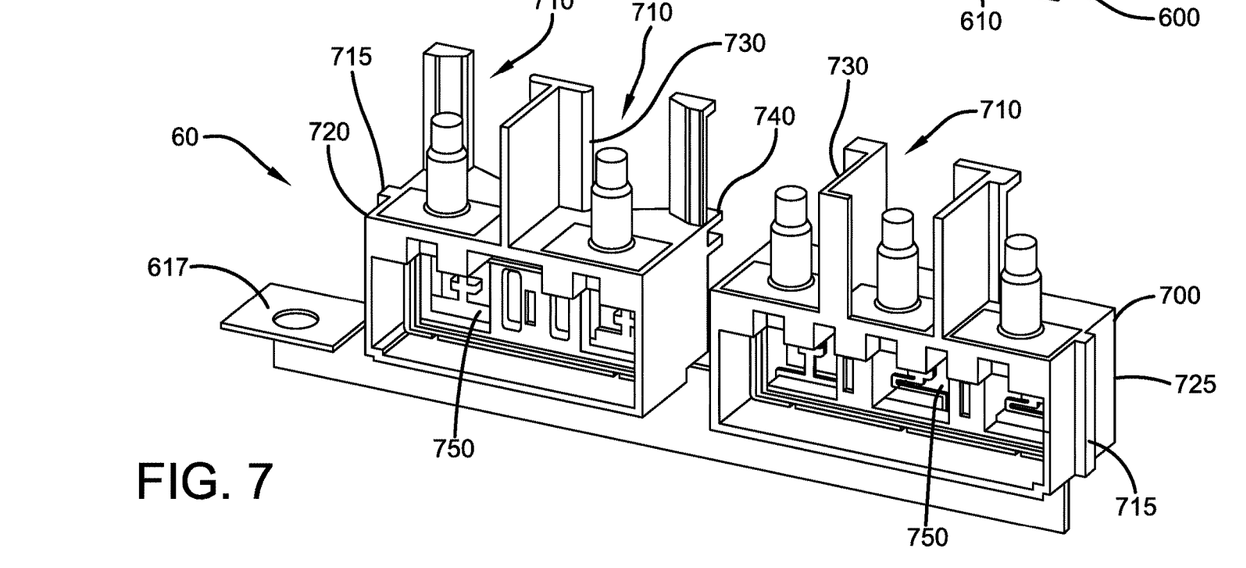
FIG. 7 is a perspective view of an example fuse block that includes the stamped busbar assembly of FIG. 6 according to some implementations of the present disclosure.
Figure 8:
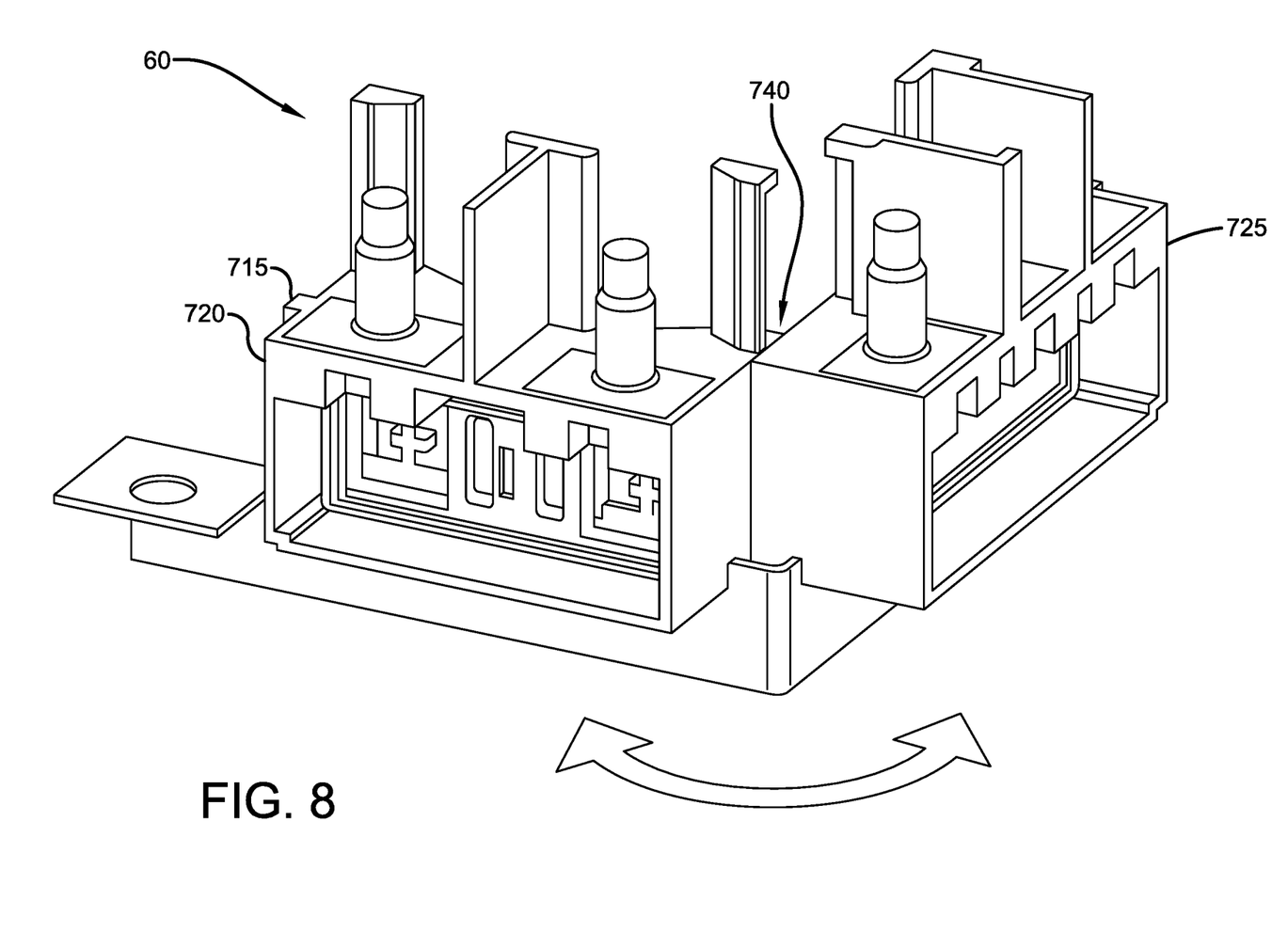
FIG. 8 is a perspective view of the example fuse block of FIG. 7 shown in a final configuration.

Referring now to FIGS. 6-8, an example fuse block 60 according to some alternative implementations of the present disclosure is illustrated. The fuse block 60 is substantially similar to the fuse block 10 described above. Furthermore, it should be appreciated that the specific features of the fuse block 60 can be incorporated into the fuse block 10, and vice versa. Accordingly, the description of fuse block 60 herein will be primarily directed to the differences between the fuse block 10 and the fuse block 60.

The fuse block 60 can include a stamped busbar assembly 600 at least partially covered by a housing 700, as discussed more fully below. The stamped busbar assembly 600 can include a main power supply portion 610 having a rectangular shaped body with a first side edge 612 and a second side edge 614 opposite the first side edge 512. The main power supply portion 610 can extend in a longitudinal direction (along the y-axis as illustrated in FIG. 6) from a first end 616 to a second end 618. Accordingly, the first and second side edges 612, 614 of the stamped busbar assembly 600 can extend from the first end 616 to the second end 618 to define the rectangular shaped body. The stamped busbar assembly 600 can also include a plurality of fuse elements 620. Each of the fuse elements 620 can extend from one of the first or second side edges 612, 614 of the stamped busbar assembly 600 in a direction (a "fuse direction" along the z-axis as illustrated in FIG. 6) that is orthogonal to the longitudinal direction in which the main power supply portion 610 extends. The fuse elements 620 are arranged to connect the main power supply portion 610 to a plurality of terminal connecting portions 630, as more fully discussed below. Each of the fuse elements 620 is designed to provide a circuit protection functionality for its corresponding circuit.

The stamped busbar assembly 600 can further include a plurality of terminal connecting portions 630 coupled to and extending from the fuse elements 620. Each of the terminal connecting portions 630 can extend from a respective fuse element 620 in a direction (a "terminal direction" along the x-axis) that is orthogonal to both the longitudinal and fuse directions. Each of the terminal connecting portions 630 can define a stud aperture 632 that is configured to receive a corresponding stud 634. Accordingly, a plurality of studs 634 can correspond to the plurality of terminal connecting portions 630, each of which being arranged within a corresponding stud aperture 632.

The stamped busbar assembly 600 is made of an electrically conductive material such that electrical power (e.g., from a battery) connected to the main power supply portion 610 can be provided to each of the terminal connecting portions 630 through a fuse element 620. In order to provide a compact design of the fuse block 60, the main power supply portion 610 of the stamped busbar assembly 600 can define a power input aperture 615. As more fully discussed herein, the power input aperture 615 can be configured to receive a power distribution box stud 330 (as illustrated in FIG. 3). As shown in FIG. 6, the power input aperture can be defined in a power input flange 617, which may extend in a direction similar to or the same as the fuse direction (along the x-axis in FIG. 6).

The stamped busbar assembly 600 can be at least partially covered by the housing 700. The housing 700 can comprise an insulative material such that the stamped busbar assembly 600 can be insulated from inadvertent or unintentional electrical connections. In certain aspects, the housing 700 can be formed by over-molding the stamped busbar assembly 600 and the plurality of studs 634. In this manner, the housing 700 can provide physical support to elements of the fuse block 60. For example only, the over-molded housing 700 can rigidly couple and constrain the studs 634 in their respective stud apertures 632.

The housing 700 can further include an access aperture 710 corresponding to each of the plurality of studs 634. The access apertures 710 can be configured to receive an eyelet terminal (such as eyelet terminal 250 described above) for coupling to a respective stud 634 and terminal connecting portion 630. In this manner, the eyelet terminals can be connected to the terminal connecting portions 630 in a single direction, that is, through the access apertures 710. Furthermore, the housing 700 can include a dovetail feature 715 on an exterior surface of the housing 700. Similar to the dovetail feature 400 illustrated in FIGS. 2 and 4 and described above, the dovetail feature 715 can be configured to mate with a corresponding dovetail feature 310 on a power distribution box 300 to which the housing 700 is coupled.

In some implementations, and with further reference to FIG. 5 discussed above, the housing 700 can comprise an index feature (not shown, but similar to index feature 220 above) associated with one or more of the access apertures 710 and associated terminal connecting portions 630. The index feature can inhibit coupling of an eyelet terminal with the particular terminal connecting portion 630 when the eyelet terminal lacks a corresponding index mating feature (e.g., index mating feature 255). Additionally or alternatively, the housing 700 can further include one or more insulating walls 730 for electrically isolating the terminal connecting portions 630. Accordingly, each insulating wall 730 can be arranged between adjacent terminal connecting portions 630. Optionally, a plurality transparent fuse covers 750 that correspond with the plurality of fuse elements 620 can be provided. The fuse covers 750 can cover and protect the fuse elements 620 from the outside environment.

Similar to the fuse block 10, the fuse block 60 can be coupled to a power distribution box 300 such that a power distribution stud 330 can extend through the power input aperture 615. The power distribution stud 330 can receive an eyelet terminal 250 to input power, e.g., from the vehicle battery (not shown). The stamped busbar assembly 600 can then distribute the vehicle power via the fuse elements 620 and the terminal connecting portions 630. More specifically, each terminal connecting portion 630 can be electrically coupled with an eyelet terminal 250 being secured to a stud 634. The eyelet terminals 250 can provide electrical power to the electrical components of the vehicle.

In some implementations, the stamped busbar assembly 600 can be formed from a single piece of busbar material arranged in a single plane (e.g., the y-z plane of FIG. 6). The single piece of busbar material can be stamped to form the stud apertures 632, the power input aperture 615, and the plurality of fuse elements 620, as well as the terminal connecting portions 630 and associated stud apertures 632. Once stamped, the single piece of busbar material can be bent to arrange the plurality of terminal connecting portions 630 to extend in the terminal direction (e.g., along the x-axis of FIG. 6). Optionally, the power input flange 617 can also be bent from the main body portion 610 to extend in a direction, e.g., in the terminal direction as illustrated. In this manner, a single piece of busbar material can be formed and configured to take the shape of the disclosed stamped busbar assembly 600. The fuse block 60 can then be completed by over-molding the housing 700 onto the stamped busbar assembly 600. Additionally, in some implementations the over-molded housing 700 can rigidly couple and constrain the studs 634 that have been inserted in their respective stud apertures 632.

In some implementations, the housing 700 can comprise a first portion 720 and a second portion 725. The first and second portions 720, 725 can be separate from each other and each overmold at least one of the plurality of studs 634. Referring now to FIG. 8, the fuse block 60 is illustrated in a final configuration in which the first portion 720 and the second portion 725 are arranged to form an L-shape. For example only, the fuse block 60 may be formed by over-molding the stamped busbar assembly 600 to form the first and second portions 720, 725. A plurality of fuse covers 750 can be installed to cover the fuse elements 620. Then, the main power supply portion 610 may be bent such that the first and second portions 720, 725 are arranged in the L-shape as shown in FIG. 8. In some implementations, the first and second portions 720, 725 of the housing 700 can have corresponding locking features 740 that fixedly secure the first portion 720 with the second portion 725 in the final configuration. In this manner, a single fuse block 60 can be formed in a compact manner and can wrap around, e.g., a power distribution block of a vehicle.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fuse block, comprising:
    a stamped busbar assembly comprising:
        a main power supply portion extending in a longitudinal direction from a first end to a second end, the main power supply portion having a rectangular shaped body with a first side edge and a second side edge opposite the first side edge, the first and second side edges extending from the first end to the second end,
        a plurality of fuse elements extending from the second side edge of the main power supply portion in a fuse direction orthogonal to the longitudinal direction, and
        a plurality of terminal connecting portions coupled to the plurality of fuse elements, each of the plurality of terminal connecting portions: (i) extending from its respective fuse element in a terminal direction that is orthogonal to both the longitudinal direction and the fuse direction, and (ii) defining a stud aperture;
    a plurality of studs corresponding to the plurality of terminal connecting portions, respectively, each of the plurality of studs being arranged within a corresponding stud aperture; and
    a housing at least partially covering the stamped busbar assembly, the housing comprising an insulative material and formed by over-molding the stamped busbar assembly and the plurality of studs, the housing including an access aperture corresponding to each of the plurality of studs and configured to receive an eyelet terminal for coupling to a respective stud and terminal connecting portion,
    wherein the main power supply portion defines a power input aperture configured to receive a power distribution box stud,
    wherein the housing comprises a first portion over-molding at least one first stud of the plurality of studs and a second portion over-molding at least one second stud of the plurality of studs, the first portion and the second portion being arranged in a linear shape in an initial configuration and the first portion and the second portion being arranged to form an L-shape in a final configuration, and
    wherein the housing further comprises an index feature associated with at least one particular access aperture and associated particular terminal connecting portion, wherein the index feature inhibits coupling of the eyelet terminal with the particular terminal connecting portion when the eyelet terminal lacks a corresponding index mating feature.

2. The fuse block of claim 1, wherein the power input aperture is defined in a power input flange that extends in the fuse direction.

3. The fuse block of claim 1, further comprising a plurality of transparent fuse covers corresponding to the plurality of fuse elements.

4. The fuse block of claim 1, wherein the housing further comprises one or more insulating walls, each insulating wall of the one or more insulating walls being arranged between adjacent terminal connecting portions.

5. The fuse block of claim 1, wherein the housing further comprises a first dovetail feature on an exterior surface of the housing, wherein the first dovetail feature is configured to mate with a corresponding second dovetail feature on a power distribution box to which the housing is coupled.

6. The fuse block of claim 5, wherein the first and second dovetail features are configured to inhibit movement of the housing along two axes.

7. The fuse block of claim 1, wherein the stamped busbar assembly is formed by (i) providing a single piece of busbar material arranged in a single plane, (ii) stamping the single piece of busbar material to form the stud apertures, the power input aperture, and the plurality of fuse elements, and (iii) bending the single piece of busbar material to arrange the plurality of terminal connecting portions to extend in the terminal direction.

8. The fuse block of claim 7, wherein the fuse block is formed by (i) overmolding the stamped busbar assembly to form the first and second portions of the housing, (ii) installing a plurality of transparent fuse covers corresponding to the plurality of fuse elements to cover the fuse elements, and (iii) bending the main power supply portion such that the first portion and the second portion are arranged to form the L-shape in the final configuration.

9. The fuse block of claim 8, wherein the first and second portions of the housing having corresponding locking features, and wherein, in the final configuration, the first portion of the housing is fixedly secured to the second portion of the housing via the locking features.

10. A fuse block, comprising:
   a stamped busbar assembly comprising:
      a main power supply portion extending in a longitudinal direction from a first end to a second end, the main power supply portion having a rectangular shaped body with a first side edge and a second side edge opposite the first side edge, the first and second side edges extending from the first end to the second end,
      a plurality of fuse elements extending from the second side edge of the main power supply portion in a fuse direction orthogonal to the longitudinal direction, and
      a plurality of terminal connecting portions coupled to the plurality of fuse elements, each of the plurality of terminal connecting portions: (i) extending from its respective fuse element in a terminal direction that is orthogonal to both the longitudinal direction and the fuse direction, and (ii) defining a stud aperture;
   a plurality of studs corresponding to the plurality of terminal connecting portions, respectively, each of the plurality of studs being arranged within a corresponding stud aperture; and
   a housing at least partially covering the stamped busbar assembly, the housing comprising an insulative material and formed by over-molding the stamped busbar assembly and the plurality of studs, the housing including an access aperture corresponding to each of the plurality of studs and configured to receive an eyelet terminal for coupling to a respective stud and terminal connecting portion,
   wherein the main power supply portion defines a power input aperture configured to receive a power distribution box stud,
   wherein the housing comprises a first portion over-molding at least one first stud of the plurality of studs and a second portion over-molding at least one second stud of the plurality of studs, the first portion and the second portion being arranged to form an L-shape in a final configuration, and
   wherein the housing further comprises an index feature associated with at least one particular access aperture and associated particular terminal connecting portion, wherein the index feature inhibits coupling of the eyelet terminal with the particular terminal connecting portion when the eyelet terminal lacks a corresponding index mating feature.

11. The fuse block of claim 10, wherein the power input aperture is defined in a power input flange that extends in the fuse direction.

12. The fuse block of claim 10, further comprising a plurality of transparent fuse covers corresponding to the plurality of fuse elements.

13. The fuse block of claim 10, wherein the housing further comprises one or more insulating walls, each insulating wall of the one or more insulating walls being arranged between adjacent terminal connecting portions.

14. The fuse block of claim 10, wherein the housing further comprises a first dovetail feature on an exterior surface of the housing, wherein the first dovetail feature is configured to mate with a corresponding second dovetail feature on a power distribution box to which the housing is coupled.

15. The fuse block of claim 14, wherein the first and second dovetail features are configured to inhibit movement of the housing along two axes.

16. The fuse block of claim 10, wherein the stamped busbar assembly is formed by (i) providing a single piece of busbar material arranged in a single plane, (ii) stamping the single piece of busbar material to form the stud apertures, the power input aperture, and the plurality of fuse elements, and (iii) bending the single piece of busbar material to arrange the plurality of terminal connecting portions to extend in the terminal direction.

17. The fuse block of claim 16, wherein the fuse block is formed by (i) overmolding the stamped busbar assembly to form the first and second portions of the housing, (ii) installing a plurality of transparent fuse covers corresponding to the plurality of fuse elements to cover the fuse elements, and (iii) bending the main power supply portion such that the first portion and the second portion are arranged to form the L-shape in the final configuration.

18. The fuse block of claim 17, wherein the first and second portions of the housing having corresponding locking features, and wherein, in the final configuration, the first portion of the housing is fixedly secured to the second portion of the housing via the locking features.

* * * * *